United States Patent
Jayawant et al.

(10) Patent No.: US 9,577,522 B2
(45) Date of Patent: Feb. 21, 2017

(54) PRE-FILTERING IN A POWER SUPPLY CONTROL CIRCUIT

(71) Applicant: International Rectifier Corporation, El Segundo, CA (US)

(72) Inventors: Saurabh Jayawant, Aliso Viejo, CA (US); Venkat Sreenivas, Winchester, MA (US); Parviz Parto, Laguna Niguel, CA (US); Robert T. Carroll, Andover, MA (US)

(73) Assignee: Infineon Technologies Americas Corp., El Segundo, CA (US)

( * ) Notice: Subject to any disclaimer, the term of this patent is extended or adjusted under 35 U.S.C. 154(b) by 86 days.

(21) Appl. No.: 14/637,485

(22) Filed: Mar. 4, 2015

(65) Prior Publication Data

US 2016/0261182 A1 Sep. 8, 2016

(51) Int. Cl.
   *H02M 3/157* (2006.01)
(52) U.S. Cl.
   CPC .................... *H02M 3/157* (2013.01)
(58) Field of Classification Search
   CPC ............ H02M 2001/0025; H02M 3/157; H02M 3/1588; H02M 2001/0012; H02M 1/143
   USPC ...................... 323/282–285, 322; 341/20–33
   See application file for complete search history.

(56) References Cited

U.S. PATENT DOCUMENTS

| | | | | |
|---|---|---|---|---|
| 7,859,324 B2* | 12/2010 | Yamashita | ............... | H02M 1/32 323/316 |
| 8,120,345 B2* | 2/2012 | Akiyama | ............... | H02M 3/156 323/282 |
| 8,278,898 B2* | 10/2012 | Davoudi | ............... | H02M 3/157 323/283 |
| 8,629,666 B2* | 1/2014 | Carroll | ............... | H02M 3/1588 323/222 |
| 2005/0116692 A1* | 6/2005 | Sugiyama | ............. | H02M 3/156 323/222 |
| 2007/0182391 A1* | 8/2007 | Chapuis | ................. | H02M 3/157 323/282 |
| 2010/0001699 A1* | 1/2010 | Dragojevic | ........... | H02M 3/157 323/234 |
| 2012/0206121 A1* | 8/2012 | Evans | .................... | H02M 3/156 323/288 |
| 2015/0338866 A1* | 11/2015 | Hu | ......................... | H02M 3/157 323/280 |

(Continued)

*Primary Examiner* — Gary L Laxton
*Assistant Examiner* — Kyle J Moody
(74) *Attorney, Agent, or Firm* — Chapin IP Law, LLC (57) ABSTRACT

A hybrid power supply circuit includes a digital circuit, a digital-to-analog converter circuit, and an analog compensator circuit (analog control circuit). According to one configuration, the digital circuit includes a digital pre-filter that substantially matches settings of analog filter circuitry present in the analog compensator circuit. During operation, the digital circuit receives control input indicating how to control a magnitude of an output voltage produced by the power supply circuit. The digital circuit passes the received through the digital pre-filter to produce a (filtered) digital reference voltage. The digital-to-analog converter circuit converts the received digital reference voltage into an analog reference voltage (a filtered rendition of the received control input). The analog compensator circuit receives and uses the digitally pre-filtered analog reference voltage as a basis to control the magnitude of the output voltage produced by the power supply circuit.

23 Claims, 9 Drawing Sheets (56) References Cited

U.S. PATENT DOCUMENTS

2016/0149483 A1\* 5/2016 McDonald .............. H02M 1/32
                                                                                                      323/304

\* cited by examiner

$$Z_c = \frac{sR_{c_2}C_{c_1}+1}{s(C_{c_1}+C_{c_2})\left(1+sR_{c_2}\frac{C_{c_1}C_{c_2}}{C_{c_1}+C_{c_2}}\right)}$$

$$Z_f = \frac{R_{f_1}(sR_{f_3}C_{f_3}+1)}{1+sC_{f_3}(R_{f_1}+R_{f_3})}$$

A FULL ORDER PRE-FILTER BECOMES: $\dfrac{Z_c}{Z_c+Z_f}$

ASSUME THAT THE RISETIME OF INTEREST IS 1 MILLISECOND,
THEN THE APPROXIMATE BANDWIDTH OF INTEREST = 0.45/1mS = 450 rad/second ≈ 71 KHz IN THIS REGION, $Z_C$ CAN BE ASSUMED TO REDUCE TO $\quad Z_{CR} = \dfrac{1}{s(C_{c_1} + C_{c_2})}$ SIMILARLY, $Z_f$ CAN BE ASSUMED TO REDUCE TO $\quad R_{f_1}$

THE REDUCED ORDER DIGITAL PRE-FILTER BECOMES:

$$\dfrac{1}{1 + sR_{f_1}(C_{c_1} + C_{c_2})}$$

PRE-FILTERING IN A POWER SUPPLY CONTROL CIRCUIT

BACKGROUND

Conventional hybrid power supply circuits include both analog and digital circuitry to produce a desired output voltage. In general, a digital portion of a conventional hybrid power supply circuit is desirable because it easily configurable, rendering it useful for many applications. A respective analog portion of a hybrid power supply circuit is typically less configurable, but is an efficient and cost-effective way of maintaining an output voltage within regulation.

During operation, the conventional hybrid power supply circuit can be configured to receive input specifying how to control a magnitude of the output voltage. The digital portion of the conventional hybrid power supply circuit converts the received input into an unfiltered analog reference voltage outputted to respective analog circuitry. The analog circuitry of the conventional hybrid power supply circuit uses the received unfiltered analog reference voltage as a basis to control the magnitude of the output voltage. For example, the conventional hybrid power supply circuit can be configured to produce the output voltage such that a magnitude of the output voltage at least proportionally tracks the analog reference voltage. In such an instance, an increase in magnitude of the analog reference voltage causes the conventional hybrid power supply circuit to increase a corresponding magnitude of the output voltage. Conversely, a decrease in magnitude of the analog reference voltage causes a corresponding decrease in the magnitude of the output voltage.

BRIEF DESCRIPTION OF EMBODIMENTS

This disclosure includes the observation that the magnitude of the output voltage of a conventional power supply is prone to overshooting and undershooting when a reference voltage is ramped up or down to adjust the magnitude of the output voltage in a corresponding manner. In other words, when an unfiltered analog reference voltage is ramped from a voltage such as 0.0 V to 1.0 V, if the ramp is sufficiently fast, the unfiltered analog reference causes a magnitude of the output voltage to at least briefly and substantially overshoot 1.0 V prior to subsequently settling to a desired setting of around 1.0 V. Conversely, when the unfiltered analog reference voltage is ramped from 1.0 V to 0.0 V, if the ramp is sufficiently fast, the magnitude of the output voltage at least briefly and substantially undershoots 0.0 V, eventually settling to a desired voltage of around 0.0 V.

In contrast to conventional techniques, embodiments herein include a novel hybrid power supply circuit including a novel digital pre-filter.

More specifically, a hybrid power supply circuit according to embodiments herein includes a digital circuit, a digital-to-analog converter circuit, and an analog control circuit (such as an analog compensator circuit). According to one example configuration, the digital circuit includes a digital pre-filter having filter setting attributes that substantially match filter setting attributes of analog filter circuitry present in the analog control circuit. During operation, the digital circuit receives a command signal (in general, a control signal) indicating how to control a magnitude of an output voltage produced by the power supply circuit. The digital circuit passes the received command signal through a digital pre-filter to produce a (filtered) digital reference voltage. The digital-to-analog converter circuit converts the received digital reference voltage into a corresponding analog reference voltage (i.e., a filtered rendition of the received command signal). The analog control circuit as described herein receives and uses the digitally pre-filtered reference voltage as a basis to control the magnitude of the output voltage produced by the power supply circuit.

In accordance with further embodiments, the analog control circuit of the hybrid power supply circuit can be configured to include amplifier circuitry. The amplifier circuitry can be configured to include an inverting input and a non-inverting input. The non-inverting input of the amplifier circuitry receives the analog reference voltage from the digital-to-analog converter circuit. The inverting input of the amplifier receives the feedback of the output voltage through the analog filter circuitry disposed in an analog control loop of the hybrid switching power supply circuit. Based on the input voltages received on the inverting and non-inverting inputs, the amplifier circuitry produces an output signal (in general, a control signal) that is used to control switching of power supply switches that generate the output voltage through an inductor.

In accordance with yet further embodiments, the received command signal indicates a setting in which to control a magnitude of the output voltage. The digital pre-filter and digital circuitry filters the received command signal in an identical or substantially similar manner that the analog filter circuitry filters the feedback of the output voltage.

Configuration settings of the digital pre-filter can be stored in any suitable location. In one embodiment, the hybrid switching power supply circuit includes configurable multi-bit storage hardware to store attributes of the digital pre-filter. The digital circuit includes one or more processing resources to access the configurable storage hardware to implement the digital pre-filter.

In accordance with still further embodiments, the digital pre-filter is a reduced order filter in comparison to a filter order of the analog filter circuitry. In such an instance, the digital pre-filter represents a near matching approximation of the analog filter circuitry. The reduced order filter (because it is not as complex as the full order filter) requires less processing resources to implement, making it desirable in applications having limited processing capability.

Alternatively, the digital pre-filter can be configured to be the same order (full order) as the analog filter circuitry.

Embodiments herein are useful over conventional techniques. For example, in contrast to conventional techniques, the pre-filtering of the reference voltage (command signal) in the digital domain or the analog domain of the hybrid switching power supply circuit reduces or substantially eliminates an overshoot/undershoot of the output voltage during conditions in which a magnitude of the command signal varies over time.

As further discussed herein, techniques herein are well suited for use in switching power supply circuitry such as hybrid synchronous DC-DC buck converters. The techniques as described herein can be applied to tracking and sequencing applications that rely on an external reference voltage (DDR tracking) to produce the respective output voltage. Additionally, the techniques described herein apply equally well to dynamic VID transitions in single-phase processor applications that are better served by analog voltage mode control such as VCCIO, VTT, etc. However, it should be noted that embodiments herein are not limited to use in such applications and that the techniques discussed herein are well suited for other applications as well.

These and other more specific embodiments are disclosed in more detail below.

Note that further embodiments herein can include analog and/or digital circuitry (e.g., one or more processor devices) to carry out and/or support any or all of the hardware or method operations disclosed herein. In other words, in one embodiment, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device (e.g., computer processing hardware) having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiments herein include a computer readable storage medium and/or system having instructions stored thereon. In accordance with one embodiment, the instructions, when executed by computer processor hardware, cause the computer processor hardware to: receive a command signal; pass the command signal through a digital pre-filter to convert the received command signal into a digital reference voltage, filter settings of the digital pre-filter substantially matching filter settings of an analog filter circuitry of an analog control circuit; convert the digital reference voltage into an analog reference voltage; and control generation of an output voltage based on the analog reference voltage and feedback of the output voltage through the analog filter circuitry.

The ordering of the operations above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description and Further Summary of Embodiments section below and corresponding figures.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

As previously discussed, embodiments herein include a hybrid power supply circuit. The hybrid power supply circuit includes a digital circuit, a digital-to-analog converter circuit, and an analog control circuit (such as an analog compensator circuit).

According to one example configuration, the digital circuit of the hybrid power supply circuit includes a digital pre-filter having filter setting attributes that substantially match filter setting attributes of analog filter circuitry present in the analog control circuit. During operation, the digital circuit receives a command signal indicating how to control a magnitude of an output voltage produced by the hybrid power supply. The digital circuit passes the received command signal through the digital pre-filter to produce a (filtered) digital reference voltage. The digital-to-analog converter circuit converts the received digital reference voltage into a corresponding analog reference voltage (i.e., a filtered rendition of the received command signal). The analog control circuit as described herein receives and uses the digitally pre-filtered analog reference voltage as a basis to control the magnitude of the output voltage produced by the power supply circuit.

As further discussed herein, in contrast to conventional techniques, the pre-filtering of the reference voltage (command signal) in the digital domain of the hybrid switching power supply circuit reduces or substantially eliminates an overshoot/undershoot of the output voltage during conditions in which a magnitude of the command signal varies over time.

Figure 1:
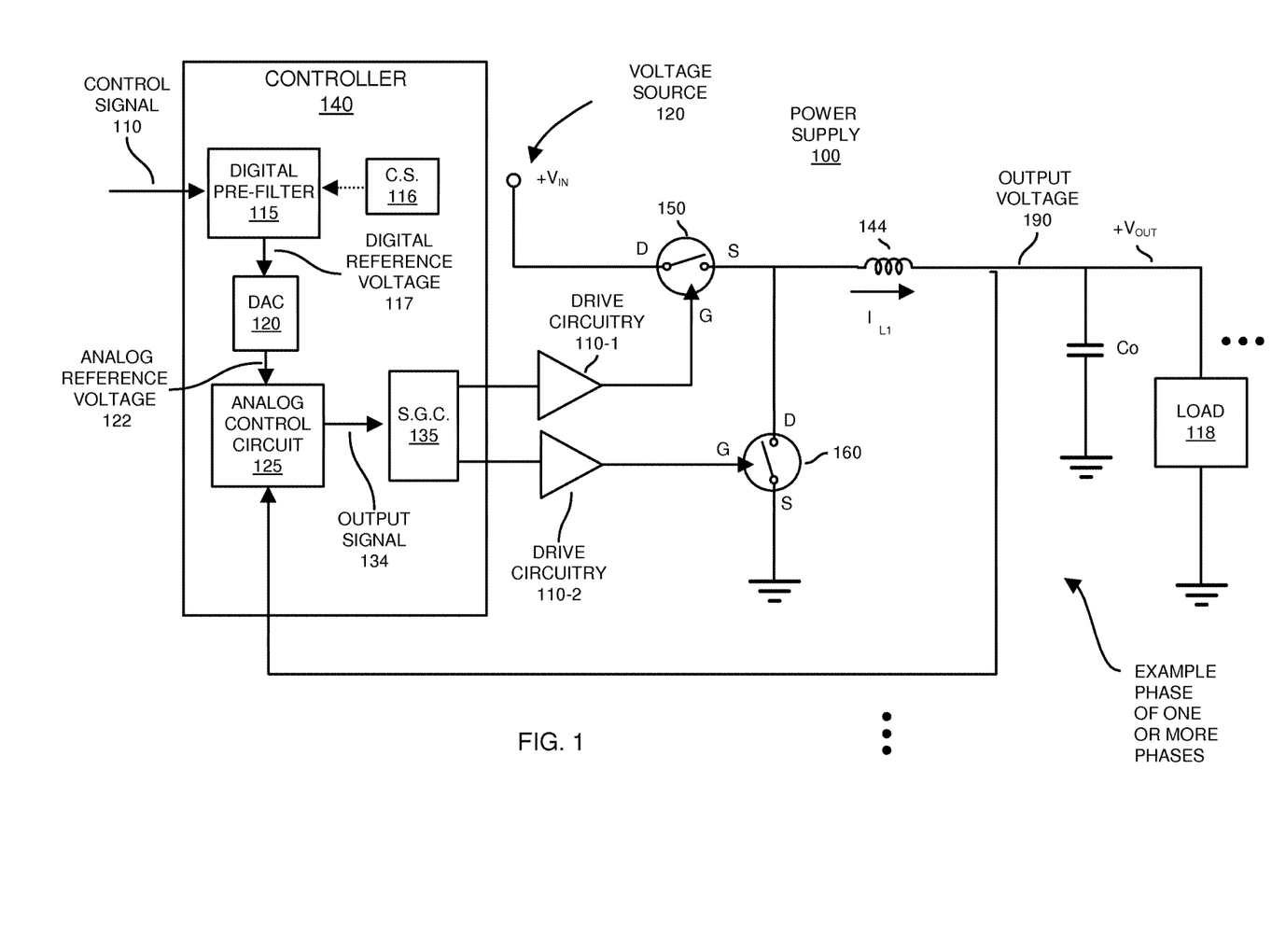
FIG. 1 is an example diagram illustrating a hybrid switching power supply including digital circuitry and analog circuitry according to embodiments herein.

Now, more specifically, FIG. 1 is an example diagram of a power supply 100 according to embodiments herein. As shown, the power supply 100 includes controller 140. As its name suggests, controller 140 controls an operation of drivers 110-1 and 110-2 to maintain the output voltage 190 within a desired range.

In this example embodiment, controller 140 receives one or more inputs such as command signal 110, output voltage 190 (Vout), etc., to control switches 150 and 160 to produce output voltage 190. Command signal 110 can be received from any suitable resource and specify a desired magnitude of the output voltage 190.

In one embodiment, the controller 140 produces a magnitude of the output voltage 190 to be a magnitude as specified by the command signal 110. Accordingly, if the command signal 110 indicates to control a magnitude of the output voltage 190 to a value of 0.6 V, the controller 140 controls switches 150 and 160 such that the magnitude of the output voltage 190 is 0.6 volts; if the command signal 110 indicates to control a magnitude of the output voltage 190 to a value of 0.8 V, the controller 140 controls switches 150 and 160 such that the magnitude of the output voltage 190 is 0.8 volts; if the command signal 110 indicates to control a magnitude of the output voltage 190 to a value of 1.0 V, the controller 140 controls switches 150 and 160 such that the magnitude of the output voltage 190 is 1.0 volts; and so on.

As more specifically shown, controller 140 includes digital pre-filter 115. Settings of the digital pre-filter 115 are stored as configuration settings 116 in appropriate storage hardware.

Digital pre-filter 115 filters received command signal 110 to produce digital reference voltage 117. The digital pre-filter 115 outputs the digital reference voltage 117 to digital-to-analog converter 120.

As its name suggests, the digital to analog converter 120 converts the digital reference voltage 117 into analog reference voltage 122. Analog reference voltage 122 indicates how to control a magnitude of the output voltage 190. Analog reference voltage 122 is a pre-filtered rendition of command signal 110.

Analog control circuit 125 receives the analog reference voltage 122. The analog control circuit 125 (such as an analog compensator circuit) uses the analog reference voltage 122 as a basis to generate the output voltage 190. For example, based on comparison of the output voltage 190 received on the feedback path of power supply 100 and the analog reference voltage 122, the analog control circuit 125 produces output signal 134 (a control signal). The signal generator circuit 135 then uses the output signal 134 as a basis to control settings of switches 150 and 160.

Thus, based on the received inputs (such as command signal 110, feedback of the output voltage 190, etc.), controller 140 outputs one or more control signals to control the control switch 150 (e.g., high side switch) and synchronous switch 160 (e.g., low side switch) to ON/OFF and OFF/ON states.

More specifically, during an ON/OFF state, the signal generator circuit 135 of controller 140 outputs an appropriate signal to drive circuitry 110-1 to activate the control switch 150 to an ON state; the signal generator circuit 135 outputs an appropriate signal to drive circuitry 110-2 to deactivate the synchronous switch 160 to an OFF state.

Conversely, during an OFF/ON state, the signal generator circuit 135 of the controller 140 outputs a signal to drive circuitry 110-1 to deactivate the control switch 150 to an OFF state; the signal generator circuit 135 of the controller 140 outputs a signal to drive circuitry 110-2 to activate the synchronous switch 160 to an ON state.

Via switching of the control switch 150 and the synchronous switch 160 between ON/OFF states and OFF/ON states at different times, the controller 140 produces output voltage 190 to power load 118.

In general, during an ON/OFF state, when control switch 150 is turned ON (i.e., activated) via respective one or more control signals generated by controller 140 (while the synchronous switch 160 is OFF), the current through inductor resource 144 increases based on a highly conductive path provided by control switch 150 between voltage source 120 (such as a 12 VDC source) and inductor resource 144.

Conversely, during an OFF/ON state, when synchronous switch 160 is turned ON (i.e., activated) via control signals generated by controller 140 (while the control switch 150 is OFF), the current through inductor resource 144 decreases based on a highly conductive path provided by the synchronous switch 160 between the inductor resource 144 and ground as shown.

As previously discussed, based on switching of the control switch 150 and the synchronous switch 160, the controller 140 regulates the output voltage 190 to a desired magnitude or range to power load 118.

Note that power supply 100 can include multiple phases. Each of the multiple phases can be similar to the example phase shown in FIG. 1. In such an embodiment, the controller 100 operates a combination of the phases to maintain the output voltage 190 within a desired range to power load 118. The phases can be operated in phase or out of phase with respect to each other.

Each phase can include a respective high side switch circuit and low side switch circuit as previously discussed. To deactivate a respective phase, the phase controller 140 can set both high side switch circuitry and low side switch circuitry of the respective phase to an OFF state. When off or deactivated, the respective phase does not contribute to producing current to power the load 118.

In certain instances, the controller 140 or other suitable resource can select how many phases to activate depending on an amount of current consumed by the load 118. For example, when the load 118 consumes a relatively large amount of current, the controller 100 can activate multiple phases to power the load 118. When the load 118 consumes a relatively small amount of current, the controller 140 can activate a single phase to power the load 118.

Figure 2:
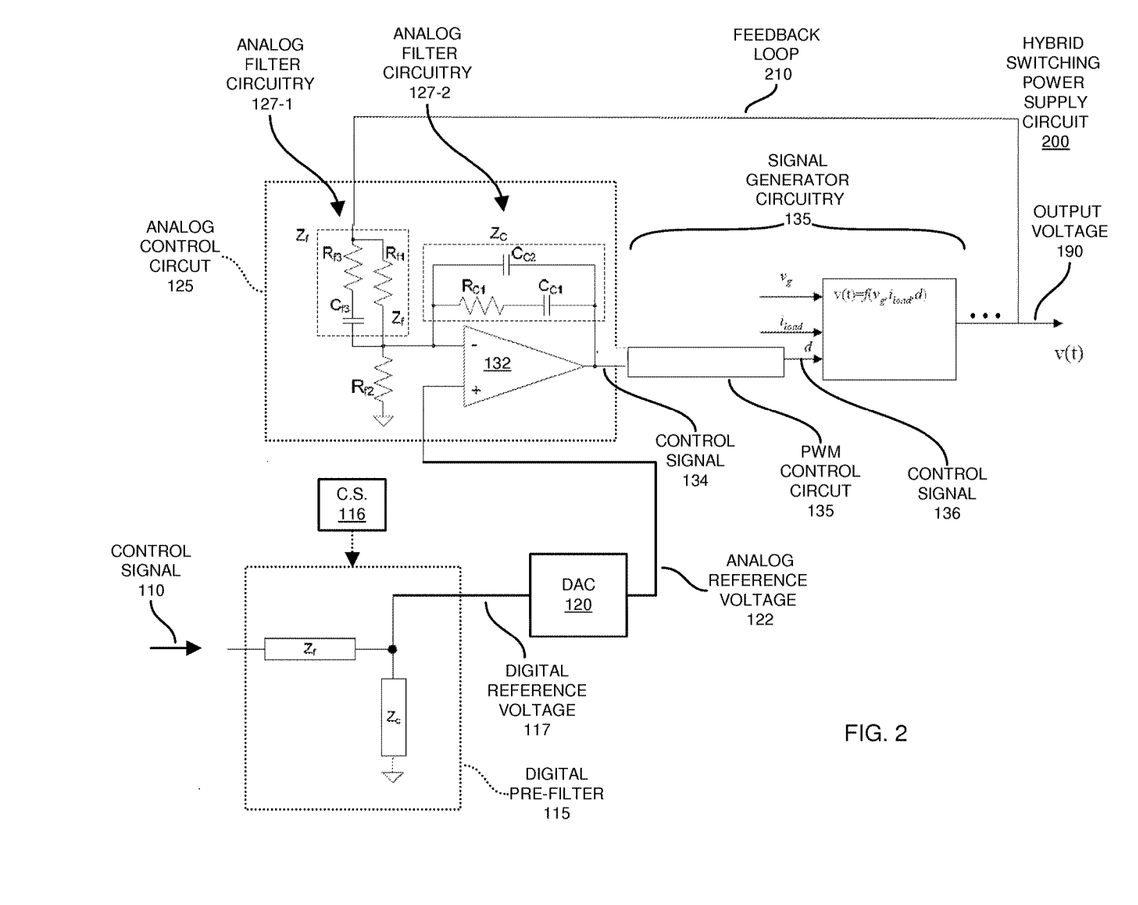
FIG. 2 is an example diagram illustrating a digital pre-filter matched to analog filter circuitry disposed in the feedback path of a power supply control circuit according to embodiments herein.

FIG. 2 is an example diagram illustrating more particular details of a digital pre-filter having filter attributes that substantially match filter attributes of analog filter circuitry disposed in the feedback path of a power supply control circuit according to embodiments herein.

As shown, and as previously discussed, the hybrid switching power supply circuit 200 includes a digital circuit and an analog circuit to control the magnitude of the output voltage 190.

The digital circuit includes digital pre-filter 115 having filter setting attributes (as specified by configuration settings 116) that identically match or substantially match filter setting attributes of analog filter circuitry 127 (analog filter circuitry 127-1 and the analog filter circuitry 127-2) present in the analog control circuit 125.

Parameters of the digital pre-filter 115 (such as configuration settings 116) can be stored in any suitable location. In one embodiment, the hybrid switching power supply circuit 200 includes a configurable multi-bit storage register to store configuration settings 116 (attributes) of the digital pre-filter 115. The digital circuit implementing the digital pre-filter 115 can include one or more processing resources to access the configurable register to implement the digital pre-filter 115.

During operation, as previously discussed, the digital pre-filter 115 receives command signal 110 indicating how to control a magnitude of an output voltage 190. The command signal 110 passes through digital pre-filter 115 to produce a (filtered) digital reference voltage 117. The digital-to-analog converter circuit 120 converts the received digital reference voltage 117 into a corresponding analog reference voltage 122 (i.e., a filtered rendition of the received command signal 110).

As further shown, the analog control circuit 125 as described herein receives and uses the digitally pre-filtered analog reference voltage 122 as a basis to control the magnitude of the output voltage 190 produced by the hybrid power supply circuit.

In accordance with further embodiments, the analog control circuit 125 (such as a compensator circuit) includes amplifiers circuitry 132. In this example embodiment, the amplifier circuitry 132 includes an inverting input (−) and a non-inverting input (+). The non-inverting input of the amplifier circuitry 132 receives the analog reference voltage 122 from the digital-to-analog converter circuit 120. The inverting input of the amplifier circuitry 132 receives feedback of the output voltage 190 through the analog filter circuitry 127 disposed in the feedback loop 210 (such as an analog control loop) of the hybrid switching power supply circuit 200.

During operation, based on inputs received at the inverting and non-inverting inputs, the amplifier circuitry 132 produces control signal 134 (i.e., output signal). In this example embodiment, the pulse width modulator control circuit 135 receives the control signal 134, and based on the control signal 134, produces control signal 136 indicating a duty cycle (d) in which to control switching of the control switch 150 and the synchronous switch 160.

It is noted that the digital pre-filter 115 can be configured to filter the command signal 110 in an identical or substantially similar manner that the analog filter circuitry 127 filters the feedback of the output voltage 190. As shown the analog filter circuitry 127-1 includes a series and parallel combination of resistors and a capacitor; analog filter circuitry 127-2 includes a series and parallel combination of capacitors and a resistor. Settings of the resistors and capacitors of analog filter circuitry 127 control filter attributes of the analog filter circuitry 127.

For example, as shown, analog filter circuitry 127-1 is represented by impedance Zf; analog filter circuitry 127-2 is represented by impedance Zc. The output voltage 190 as fed back through feedback loop 210 is filtered by a series connection of impedance Zf (analog filter circuitry 127-1) and Zc (analog filter circuitry 127-2). In one embodiment, the digital pre-filter 115 includes a series combination of Zf and Zc, matching the values of resistors and capacitors in analog filter circuitry 127.

In one embodiment, if an appropriate number of configuration registers are available to store coefficients (such as up to 5 or more filter coefficients), a full order (such as a third order) rendition of digital pre-filter 115 may be implemented to provide the highest amount of reducing overshoot/undershoot on the output voltage 190.

Figure 3:
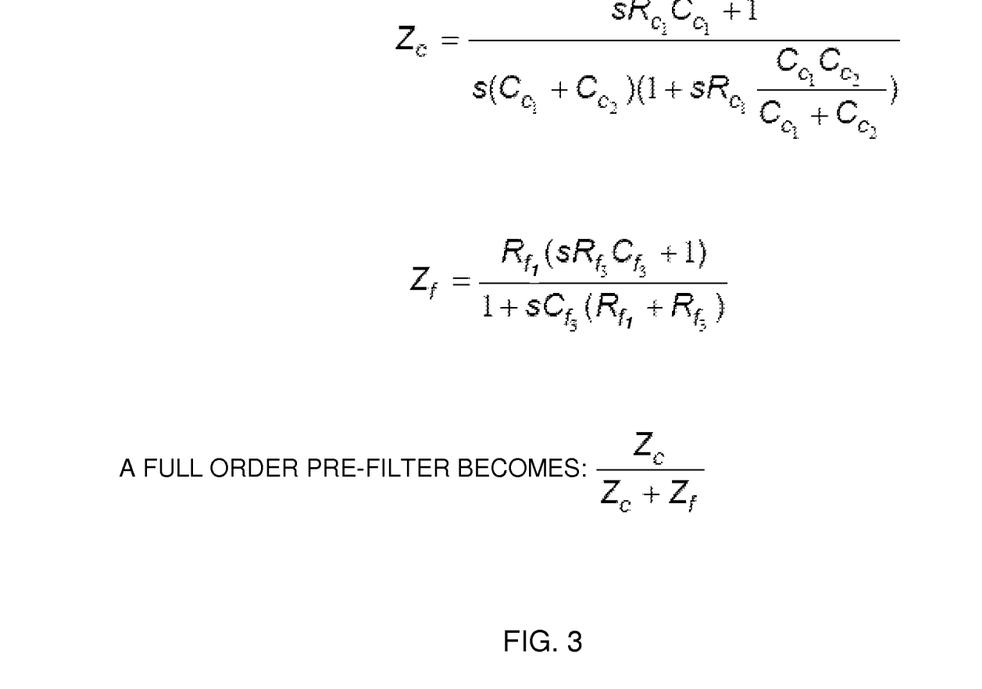
FIG. 3 is an example diagram illustrating a full order digital pre-filter according to embodiments herein.

FIG. 3 is an example diagram illustrating a full order digital pre-filter according to embodiments herein.

In this example embodiment, as shown in FIG. 3, the configuration settings 116 specify filter settings having the same number of poles and zeros as present in the analog filter circuitry 127. In such an instance, the full order rendition of the digital pre-filter 115 becomes:

$$\text{prefilter} = \frac{Z_c}{Z_c + Z_f}$$

Figure 4:
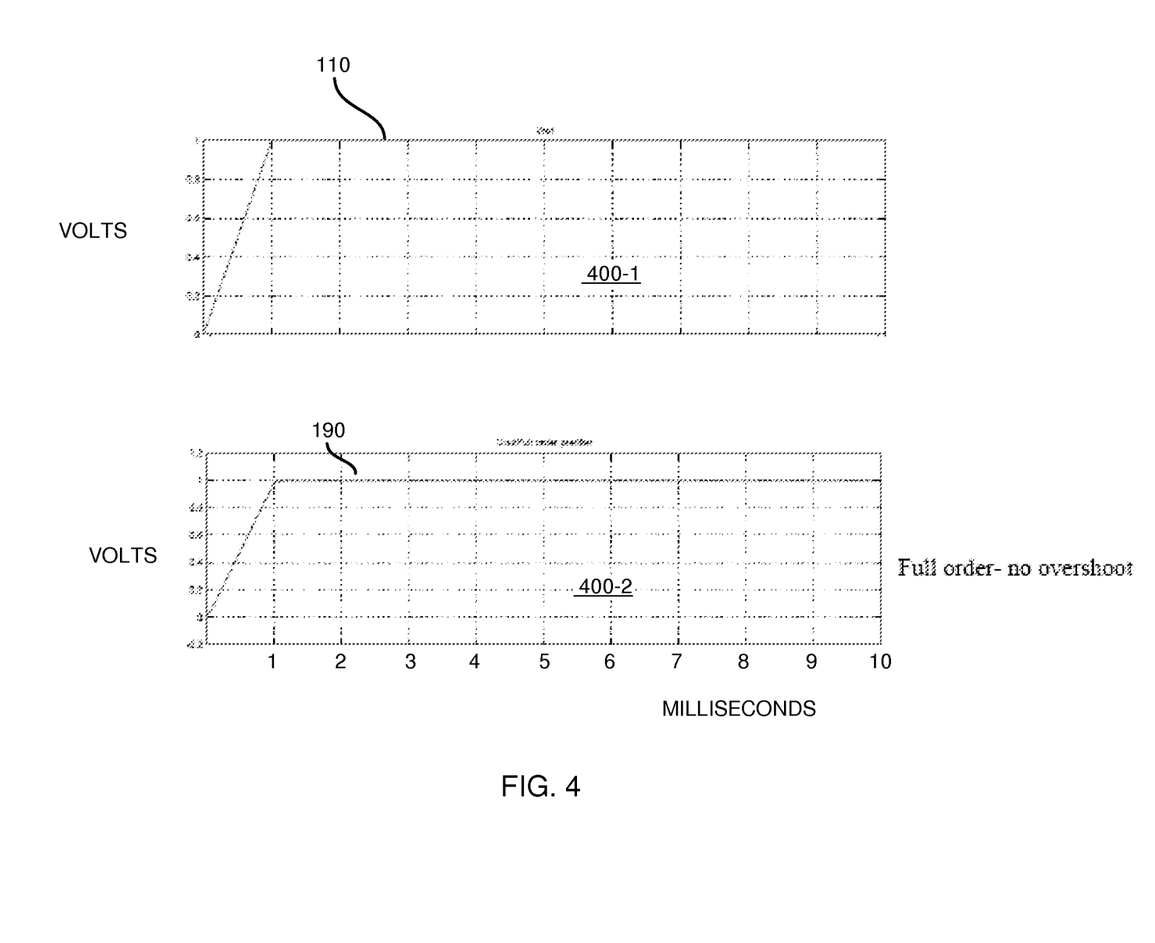
FIG. 4 is an example diagram illustrating theoretical results of using a full order digital pre-filter to reduce overshoot/undershoot according to embodiments herein.

FIG. 4 is an example diagram illustrating theoretical results of implementing a full order digital pre-filter to reduce overshoot/undershoot according to embodiments herein.

As shown, the timing diagram 400-1 indicates how received command signal 110 ramps up over time between 0 and 1 milliseconds. Because the digital pre-filter 115 has poles and zeros that identically or substantially matches those in analog filter circuitry 127, the analog control circuit 125 produces output signal 134 such that there is substantially little or no overshoot (i.e., less than 1% or 10 millivolts overshoot) on the output voltage 190. In other words, the output voltage 190 does not overshoot 1.0 V.

Thus, embodiments herein are useful over conventional techniques. For example, in contrast to conventional techniques, the pre-filtering of the reference voltage (command signal) in the digital domain using the digital pre-filter 115 reduces or substantially eliminates an overshoot (or undershoot if the command signal 110 ramps downward) of the output voltage 190 during conditions in which a magnitude of the command signal varies over time.

Figure 5:
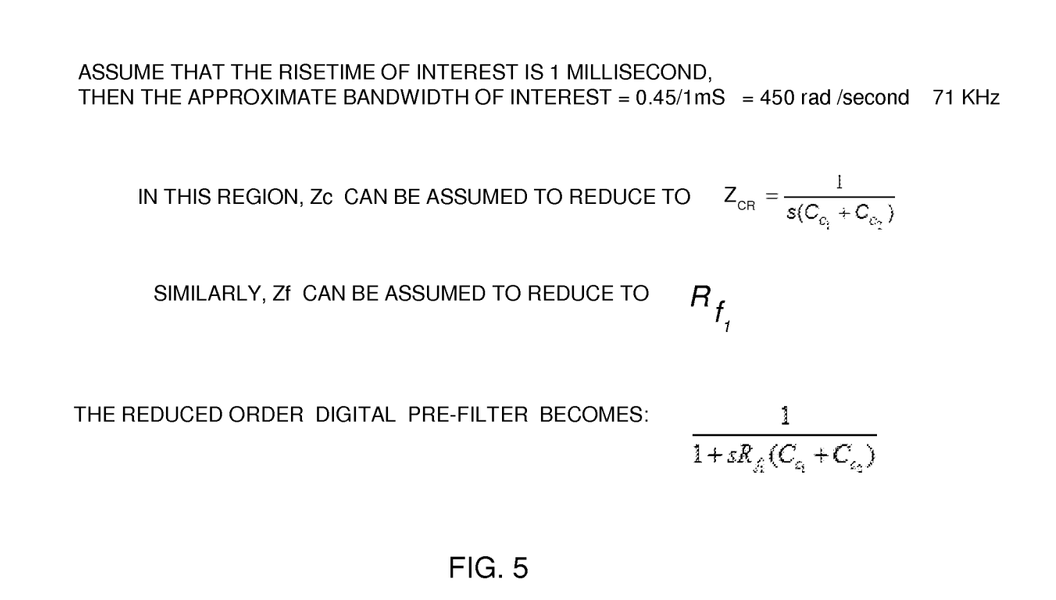
FIG. 5 is an example diagram illustrating a reduced order digital pre-filter according to embodiments herein.

FIG. 5 is an example diagram illustrating a reduced order digital pre-filter according to embodiments herein. As previously discussed, the digital pre-filter 115 can be configured to be a reduced order filter in comparison to an order of the analog filter circuitry 127. In such an instance, the digital pre-filter 115 has fewer poles and/or zeros then the full order pre-filter as discussed above. However, even though the filter is a reduced order, the digital pre-filter 115 represents a near matching approximation of the analog filter circuitry 127 instead of being more precise as discussed above. Implementation of digital pre-filter 115 as a reduced order filter that approximates attributes of the analog filter circuitry 127 is useful because it requires fewer storage resources (to store coefficients associated with the digital pre-filter 115) as well as requires less digital signal processing power to implement. This makes it desirable to use a reduced order rendition of digital pre-filter 115 in applications having limited processing and/or storage capability. In one embodiment, the full order filter as described herein is a third order filter that is reduced to a first order filter or a second order filter.

In this example embodiment, it is assumed that the rise time of interest is 1 millisecond. This corresponds to an approximate bandwidth of interest of around 350 Hz. In such an instance, Zc reduces to Zcr as shown. In a similar manner, Zf reduces to $Rf_2$. Instead of the full order pre-filter Zc/[Zc+Zf], the reduced order, approximated rendition of the digital pre-filter 115 in FIG. 5 becomes:

$$\text{Reduced Order Prefilter} = \frac{1}{1 + sR_{f_1}(C_{c_1} + C_{c_2})}$$

Figure 6:
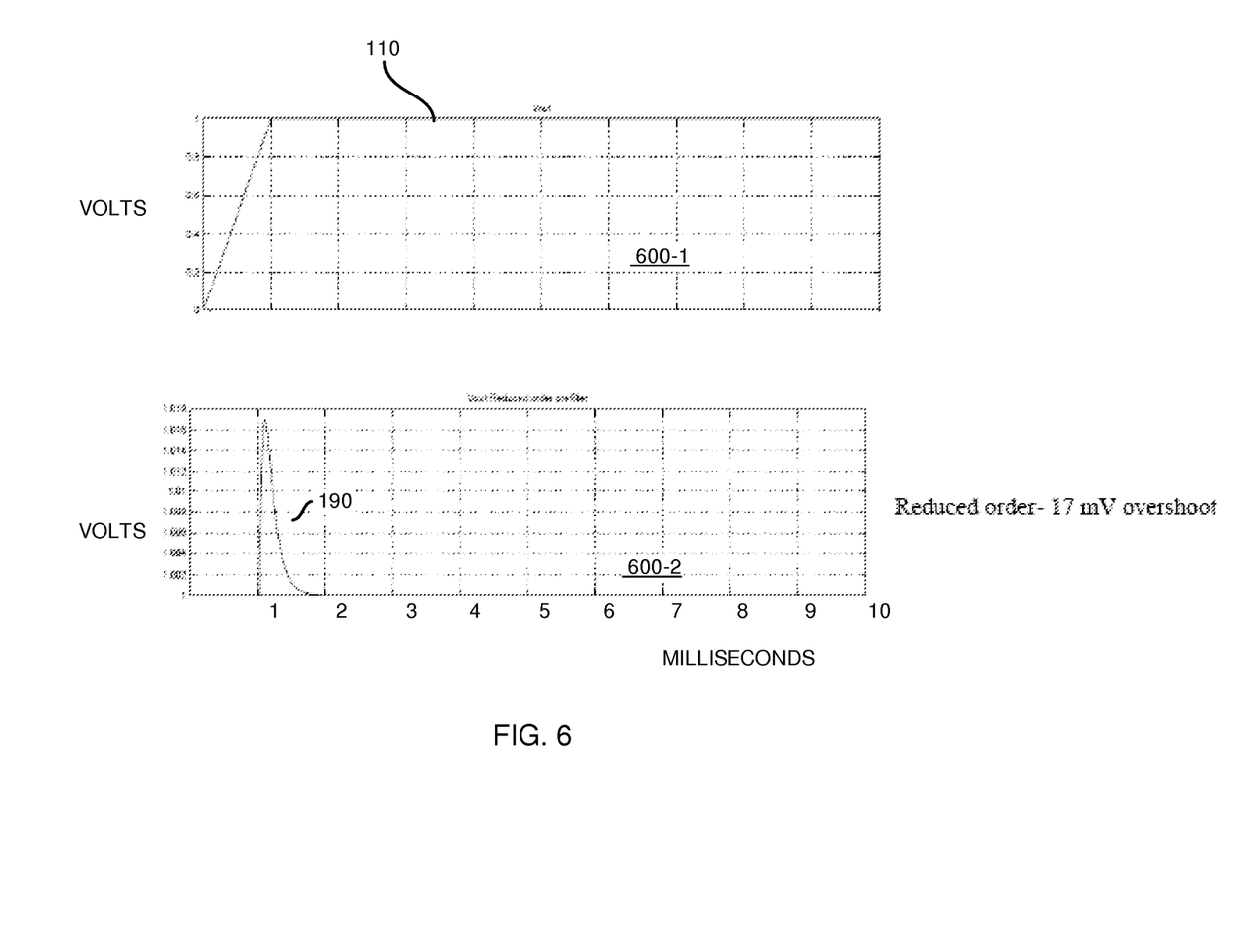
FIG. 6 is an example diagram illustrating theoretical results of using the reduced order digital pre-filter to reduce overshoot/undershoot according to embodiments herein.

FIG. 6 is an example diagram illustrating theoretical results of using the reduced order digital pre-filter (as described in FIG. 5) to reduce overshoot/undershoot according to embodiments herein.

As shown, the timing diagram 600-1 indicates how command signal 110 ramps up over time between 0 and 1 milliseconds. Because the reduced order digital pre-filter 115 (even though it has fewer poles and zeros than the full order) approximately and substantially match those in analog filter circuitry 127, the analog control circuit 125 produces output signal 134 such that there is relatively little overshoot such as 17 millivolts (i.e., less than 5% overshoot) of the output voltage 190 above 1.0 volts during the output voltage transition.

Thus, use of the reduced order digital pre-filter 115 is useful over conventional techniques. For example, in contrast to conventional techniques, the reduced order pre-filtering of the reference voltage (command signal) in the digital domain using the reduced order digital pre-filter 115 is simpler to implement than the full order rendition and provides reduced overshoot (or undershoot if the command signal 110 ramps downward) of the output voltage 190 during conditions in which a magnitude of the command signal varies over time.

Figure 7:
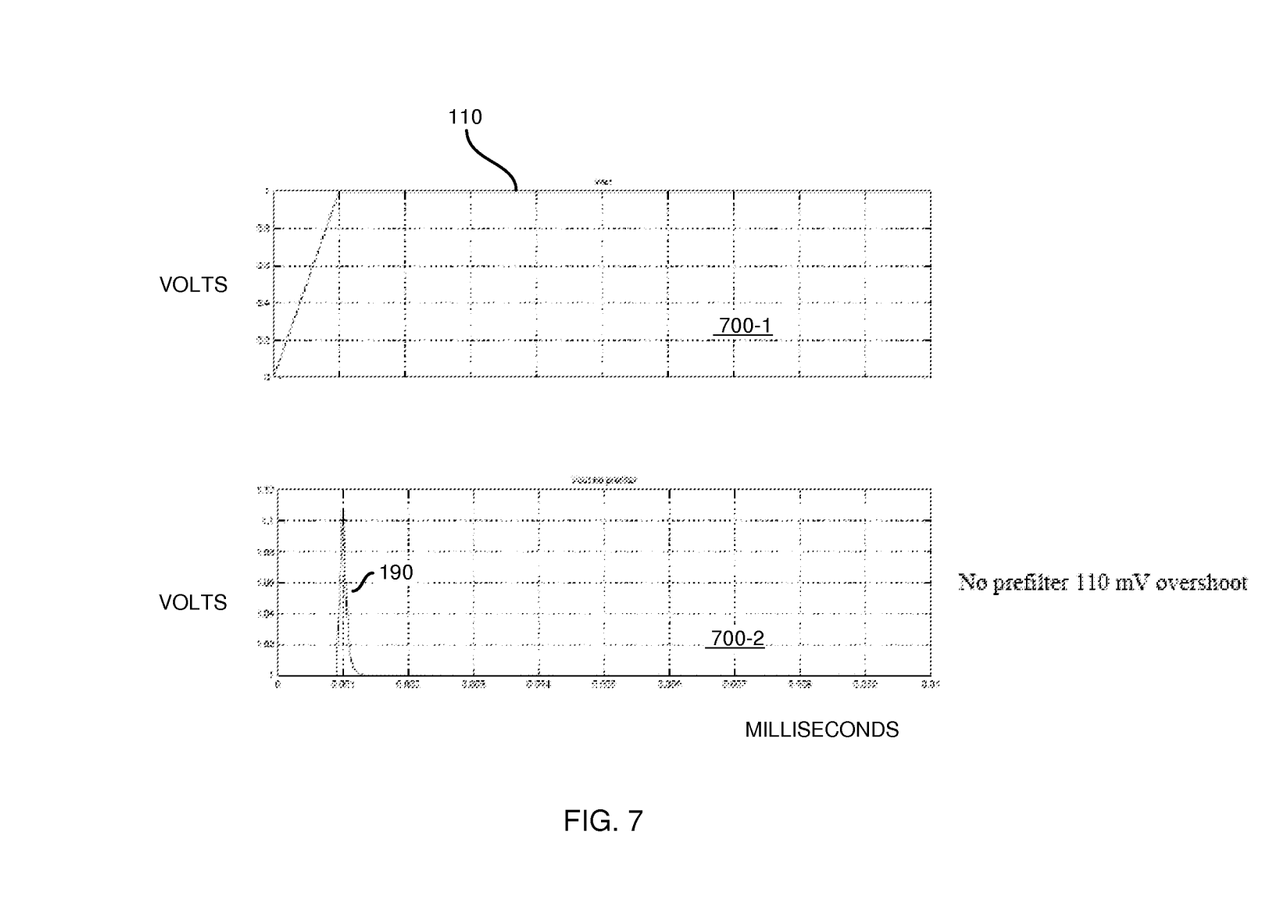
FIG. 7 is an example diagram illustrating occurrence of an overshoot condition that occurs without use of a digital pre-filter as described herein.

For comparison purposes, FIG. 7 is an example diagram illustrating occurrence of an overshoot condition that occurs without use of a digital pre-filter as described herein. For example, timing diagram 700-1 illustrates command signal 110 fed into the non-inverting input of amplifier circuitry 132 without use of the digital pre-filter 115. In such an instance, the unfiltered command signal 110 becomes the reference signal. As shown, lack of a digital pre-filter 115 and input of a non-filtered version of the command signal 110 (analog reference voltage) into the non-inverting input of the amplifier circuitry 132 results in a substantial overshoot (such as 11% overshoot) on the output voltage 190.

As an example in which there is no digital pre-filter 115, when the command signal 110 is ramped from 0.0 V to 1.0 V in one millisecond as shown in timing diagram 700-1, the magnitude of the output voltage 190 over shoots 1.0 V by 110 millivolts, amounting to an 11% (110 mV/1000 mV) overshoot.

Accordingly, in contrast to conventional circuits, the inclusion and use of the digital pre-filter 115 as previously discussed provides a substantial reduction of an overshoot/undershoot of the output voltage 190 during conditions in which the reference voltage (command signal 110) changes over time.

Figure 8:
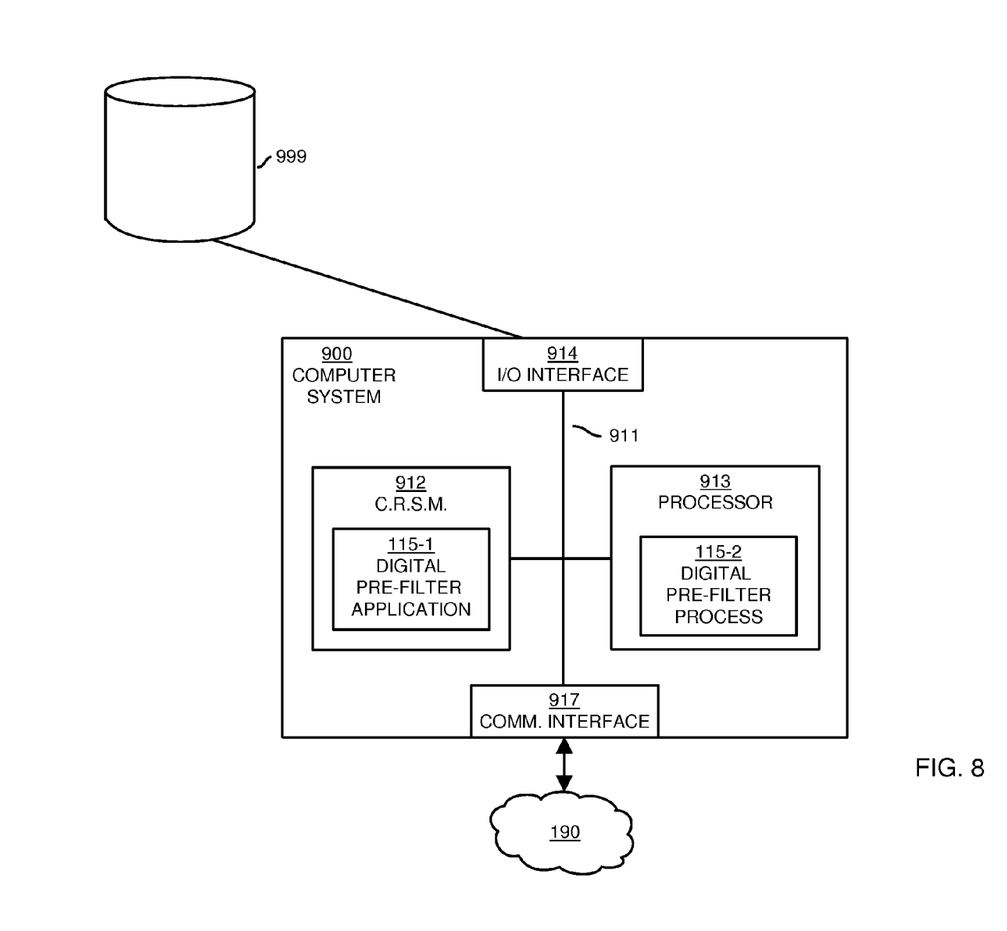
FIG. 8 is an example diagram illustrating a computer architecture to execute voltage ramping according to embodiments herein.

FIG. 8 is an example block diagram of a computer system for implementing any of the operations associated with the power supply control circuitry according to embodiments herein. In one embodiment, the controller 140 includes computer system 900 to execute operations associated with the digital pre-filter 115 or other digital circuitry as discussed herein.

As shown, computer system 900 of the present example includes an interconnect 911 that couples computer readable storage media 912 such as a non-transitory type of media (i.e., any type of hardware storage medium) in which digital information can be stored and retrieved, a processor 913 (e.g., a digital signal processor), I/O interface 914, and a communications interface 917.

I/O interface 914 provides connectivity to resources such as remote storage resource 999, etc.

Computer readable storage medium 912 can be any hardware storage device or system such as memory, optical storage, hard drive, floppy disk, etc. In one embodiment, the computer readable storage medium 912 stores instructions and/or data.

Communications interface 917 enables the computer system 900 and processor 913 to communicate with other resources such as over network 190. I/O interface 914 enables processor 913 to access data in repository 999.

As shown, computer readable storage media 912 is encoded with digital pre-filter application 115-1 (e.g., software, firmware, etc.) executed by processor 913. Digital pre-filter application 115-1 can be configured to include instructions to implement any of the operations as discussed herein.

During operation of one embodiment, processor 913 accesses computer readable storage media 912 via the use of interconnect 911 in order to launch, run, execute, interpret or otherwise perform the instructions associated with digital pre-filter application 115-1 stored on computer readable storage medium 912.

Execution of the digital pre-filter application 115-1 produces processing functionality such as digital pre-filter process 115-2 in processor 913. In other words, the digital pre-filter process 115-2 associated with processor 913 represents one or more aspects of executing digital pre-filter application 115-1 within or upon the processor 913 in the computer system 700.

Figure 9:
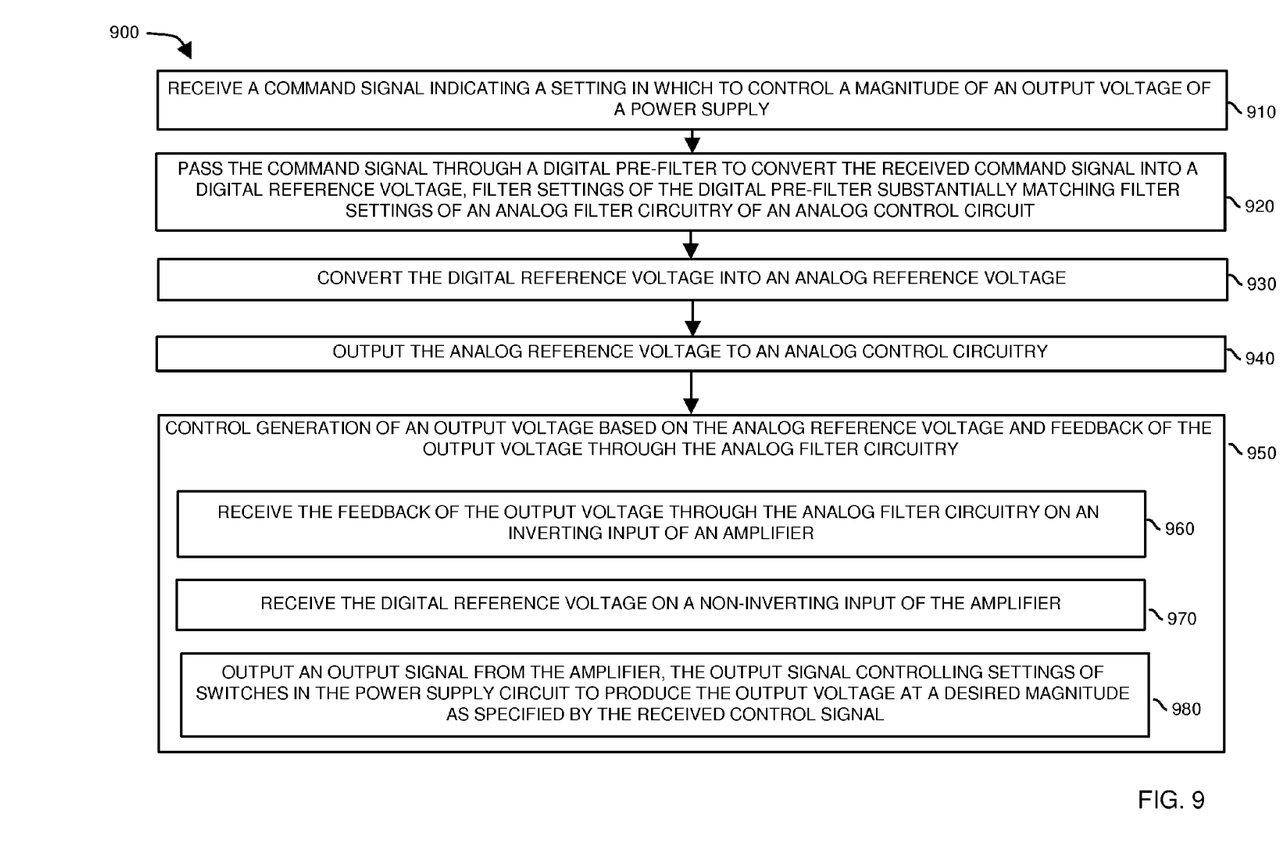
FIG. 9 is an example diagram illustrating a method according to embodiments herein.

FIG. 9 is a flowchart 900 illustrating an example method according to embodiments herein. Note that there will be some overlap with respect to concepts as discussed above.

In processing block 910, the digital portion of the controller 140 receives a command signal 110 indicating a setting in which to control a magnitude of the output voltage 190 of the power supply 100.

In processing block 920, the digital portion of the controller 140 passes the command signal 110 through digital pre-filter 115 to convert the received command signal 110 into a digital reference voltage 117. In one embodiment, filter settings of the digital pre-filter 115 substantially match filter settings of the analog filter circuitry 127 in analog control circuit 125.

In processing block 930, the digital-to-analog converter 120 converts the digital reference voltage 117 into an analog reference voltage 122.

In processing block 940, the digital-to-analog converter 120 outputs the generated analog reference voltage 122 to the analog control circuitry 122.

In processing block 950, the amplifier circuitry 132 of the analog control circuit 125 controls generation of the output voltage 190 based on a combination of the analog reference voltage 122 and feedback of the output voltage 190 through the analog filter circuitry 127.

In sub-processing block 960, the amplifier circuitry 132 receives the feedback of the output voltage 190 through the analog filter circuitry 127 on its inverting input (−).

In sub-processing block 970, the amplifier circuitry 132 receives the digital reference voltage 122 on its non-inverting input (+).

In sub-processing block 980, the amplifier circuitry 132 outputs control signal 134 (an output signal) to the PWM control circuit 135. In one embodiment, the output signal 134 controls of a duty cycle, d, of activating/deactivating switches in the power supply 100 to produce the output voltage 190 within a desired magnitude as specified by the received command signal 110.

Note again that the digital pre-filter as described herein is well suited for use in power supply applications and reducing overshoot/undershoot of an output voltage during a condition in which a corresponding reference voltage varies over time. However, it should be noted that embodiments herein are not limited to use in such applications and that the techniques discussed herein are well suited for use in other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred and summary embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A hybrid switching power supply circuit comprising:
   a digital circuit, the digital circuit operable to pass received command signal through a digital pre-filter to produce a digital reference voltage, the digital pre-filter substantially matching analog filter circuitry in an analog control circuit;
   a digital-to-analog converter circuit to convert the digital reference voltage into an analog reference voltage; and
   the analog control circuit operable to control generation of an output voltage of the hybrid switching power supply circuit based on the analog reference voltage and feedback of the output voltage through the analog filter circuitry.

2. The hybrid switching power supply circuit as in claim 1, wherein the received command signal indicates a setting in which to control a magnitude of the output voltage, the digital pre-filter filtering the command signal in a substantially similar manner that the analog filter circuitry filters the feedback of the output voltage.

3. The hybrid switching power supply circuit as in claim 1, wherein the analog filter circuitry resides in an analog control loop of the hybrid switching power supply circuit.

4. The hybrid switching power supply circuit as in claim 1, wherein the analog control circuit includes:
   an amplifier, the amplifier having an inverting input and a non-inverting input, the amplifier operable to produce a command signal that controls switching of power supply switches that generate the output voltage through an inductor.

5. The hybrid switching power supply circuit as in claim 4, wherein the non-inverting input of the amplifier receives the analog reference voltage from the digital-to-analog converter circuit; and
   wherein the inverting input of the amplifier receives the feedback of the output voltage through the analog filter circuitry.

6. The hybrid switching power supply circuit as in claim 1, wherein the digital pre-filter is a reduced order filter in comparison to an order of the analog filter circuitry, the digital pre-filter representing an approximation of the analog filter circuitry.

7. The hybrid switching power supply circuit as in claim 1, wherein filtering of the command signal using the digital pre-filter reduces overshoot and undershoot transients on the output voltage during respective conditions in which a magnitude of the command signal varies over time.

8. The hybrid switching power supply circuit as in claim 1 further comprising:
   a configurable register, the configurable register storing attributes of the digital pre-filter, the digital circuit including a processor to access the configurable register to implement the digital pre-filter.

9. The hybrid switching power supply circuit as in claim 1, wherein the digital pre-filter is of a same order as and substantially matches the analog filter circuitry.

10. The hybrid switching power supply circuit as in claim 1 further comprising:
    a control switch;
    a synchronous switch; and
    a pulse width modulator resource, the pulse width modulator resource producing a pulse width control signal based on a control signal produced by the analog control circuit, the pulse width control signal controlling switching of the control switch and the synchronous switch between ON states and OFF states to produce the output voltage in accordance with a magnitude as specified by the digital reference voltage.

11. The hybrid switching power supply circuit as in claim 1, wherein a voltage magnitude as specified by the received command signal varies over time.

12. The hybrid switching power supply circuit as in claim 1, wherein the analog control circuit includes compare circuitry to compare the output voltage to the analog reference voltage.

13. The hybrid switching power supply circuit as in claim 1, wherein the received command signal indicates settings in which to control a magnitude of the output voltage which varies over time, the digital pre-filter providing substantially similar filter attributes as those of the analog filter circuitry; and the hybrid switching power supply circuit further comprising:
  a control switch;
  a synchronous switch; and
  a pulse width modulator resource, the pulse width modulator resource operable to produce a pulse width control signal based on a control signal produced by the analog control circuit, the pulse width control signal controlling switching of the control switch and the synchronous switch between ON states and OFF states to produce the output voltage in accordance with a magnitude as specified by the digital reference voltage.

14. A method comprising:
receiving a command signal;
passing the command signal through a digital pre-filter to convert the received command signal into a digital reference voltage, filter settings of the digital pre-filter substantially matching filter settings of an analog filter circuitry of an analog control circuit;
converting the digital reference voltage into an analog reference voltage; and
controlling generation of an output voltage based on the analog reference voltage and feedback of the output voltage through the analog filter circuitry.

15. The method as in claim 14, wherein controlling generation of the output voltage based on the analog reference voltage and the feedback of the output voltage through the analog filter circuitry includes:
amplifying a difference between the output voltage received on the feedback path through the analog filter circuitry and the analog reference voltage.

16. The method as in claim 15, wherein amplifying the difference includes:
receiving the feedback of the output voltage through the analog filter circuitry on an inverting input of an amplifier;
receiving the digital reference voltage on a non-inverting input of the amplifier; and
outputting an output signal from the amplifier, the output signal controlling settings of switches in a power supply circuit to produce the output voltage at a desired magnitude as specified by the received command signal.

17. The method as in claim 14, wherein the command signal indicates a setting in which to control a magnitude of the output voltage, the digital pre-filter filtering the command signal in a substantially similar manner that the analog filter circuitry filters the feedback of the output voltage.

18. The method as in claim 14, wherein filtering of the command signal using the digital pre-filter reduces an overshoot/undershoot of the output voltage during conditions in which a magnitude of the command signal varies over time.

19. The method as in claim 14 further comprising:
storing attributes of the digital pre-filter in a register; and
accessing the register to implement the digital pre-filter.

20. The method as in claim 19, wherein the digital pre-filter is of a same filter order as the analog filter circuitry.

21. The method as in claim 14, wherein the digital pre-filter is a reduced order filter in comparison to an order of the analog filter circuitry.

22. The method as in claim 14, wherein controlling generation of the output voltage based on a combination of the analog reference voltage and the feedback of the output voltage through the analog filter circuitry includes:
producing an output signal, the output signal controlling switching of a control switch and a synchronous switch between ON states and OFF states to produce the output voltage in accordance with a magnitude as specified by the digitally pre-filtered analog reference voltage.

23. Computer-readable storage hardware having instructions stored thereon, the instructions, when carried out by computer processor hardware, causes the computer processor hardware to perform operations of:
receiving a command signal;
implementing a digital pre-filter to convert the received command signal into a digital reference voltage, attributes of the digital pre-filter substantially matching filter attributes of an analog filter circuitry in a feedback path of an analog power supply control circuit; and
outputting the digital reference voltage to a digital-to-analog converter circuit that converts the digital reference voltage into an analog reference voltage, the analog reference voltage inputted to the analog power supply control circuit to control generation of an output voltage.

* * * * *